United States Patent

Haugland

[15] 3,687,314
[45] Aug. 29, 1972

[54] DEVICE FOR LOADING A SNOWMOBILE ONTO A TRUCK

[72] Inventor: Earl W. Haugland, Hampden, N. Dak. 58338

[22] Filed: Sept. 24, 1970

[21] Appl. No.: 75,136

[52] U.S. Cl. ............................. 214/83.24, 214/85
[51] Int. Cl. ....................................... B60p 1/44
[58] Field of Search ............ 214/85, 85.1, 83.24, 515

[56] References Cited

UNITED STATES PATENTS

| | | | |
|---|---|---|---|
| 2,327,680 | 8/1943 | Tavaris | 214/83.24 |
| 276,685 | 5/1883 | Harley | 214/85 |
| 3,155,258 | 11/1964 | Fincannon | 214/85 X |

*Primary Examiner*—Albert J. Makay
*Attorney*—Dugger, Peterson, Johnson & Westman

[57] ABSTRACT

The device comprises two hinged sections, one section having wheels thereon and the other initially serving as an inclined ramp. With the wheeled section resting on the tailgate or floor of a truck, the snowmobile is first moved onto the ramp section. The ramp section is then raised so that it is horizontal with the wheeled section and the entire device is moved forwardly along the flooring of the truck by means of the wheels so that both the device and snowmobile are fully contained within the box of the truck.

9 Claims, 6 Drawing Figures

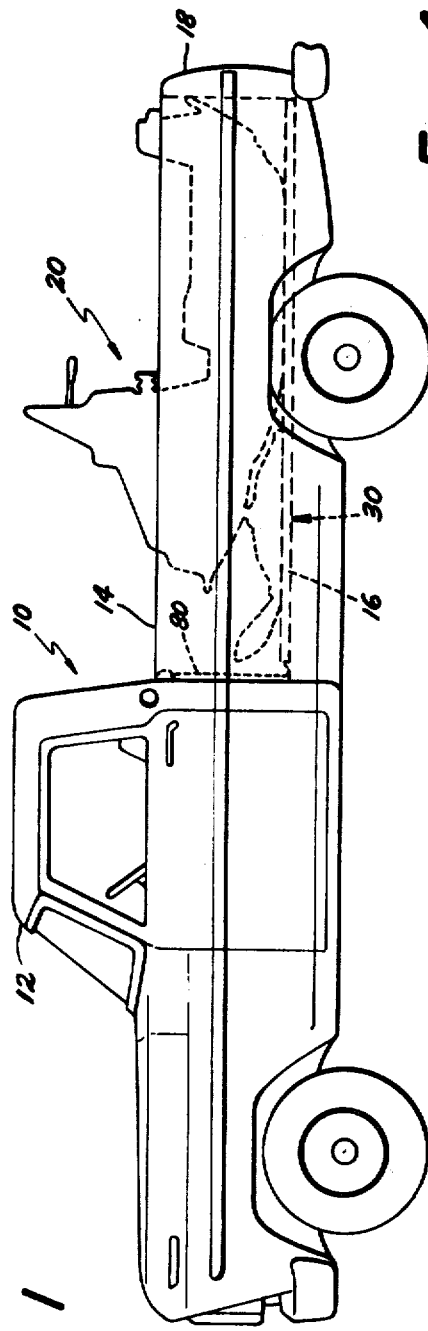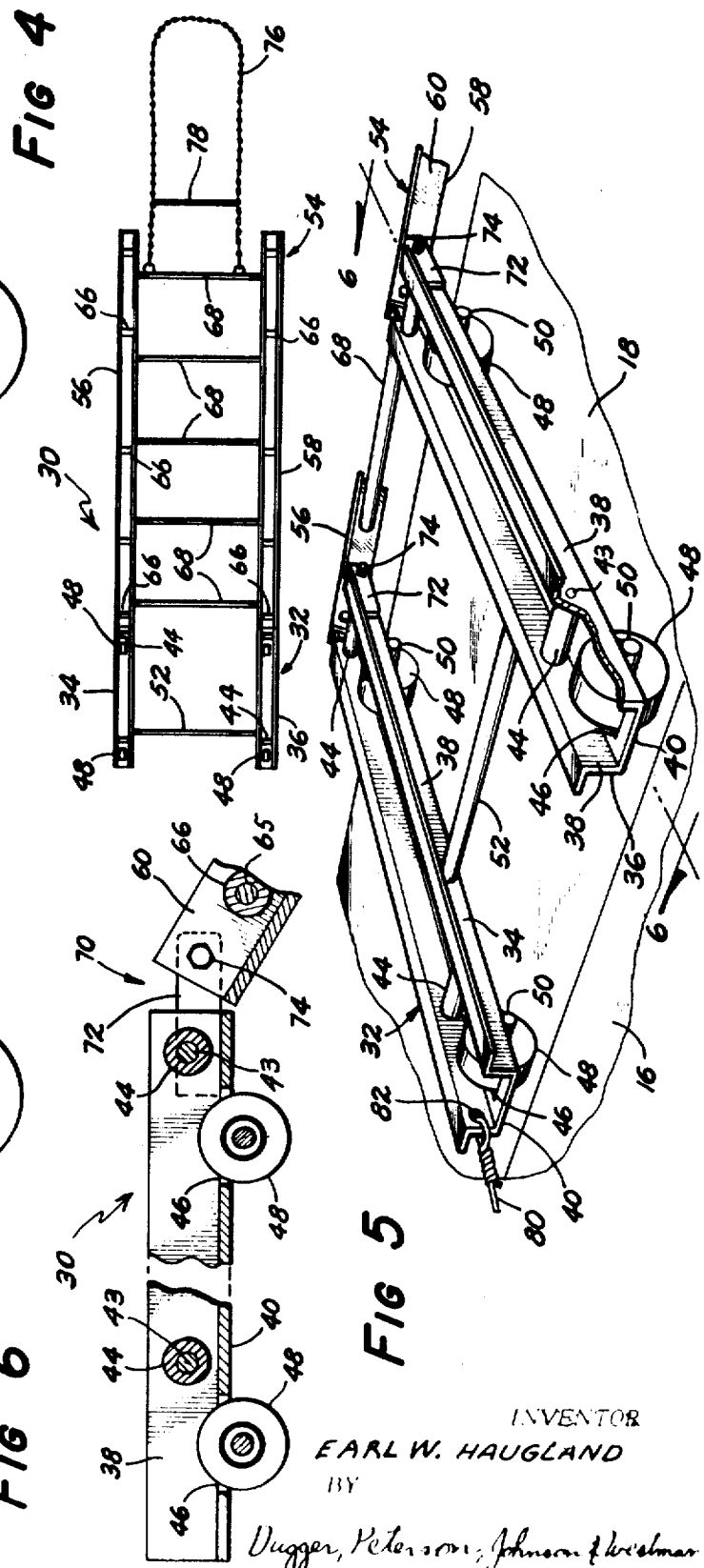

PATENTED AUG 29 1972
3,687,314
SHEET 2 OF 2
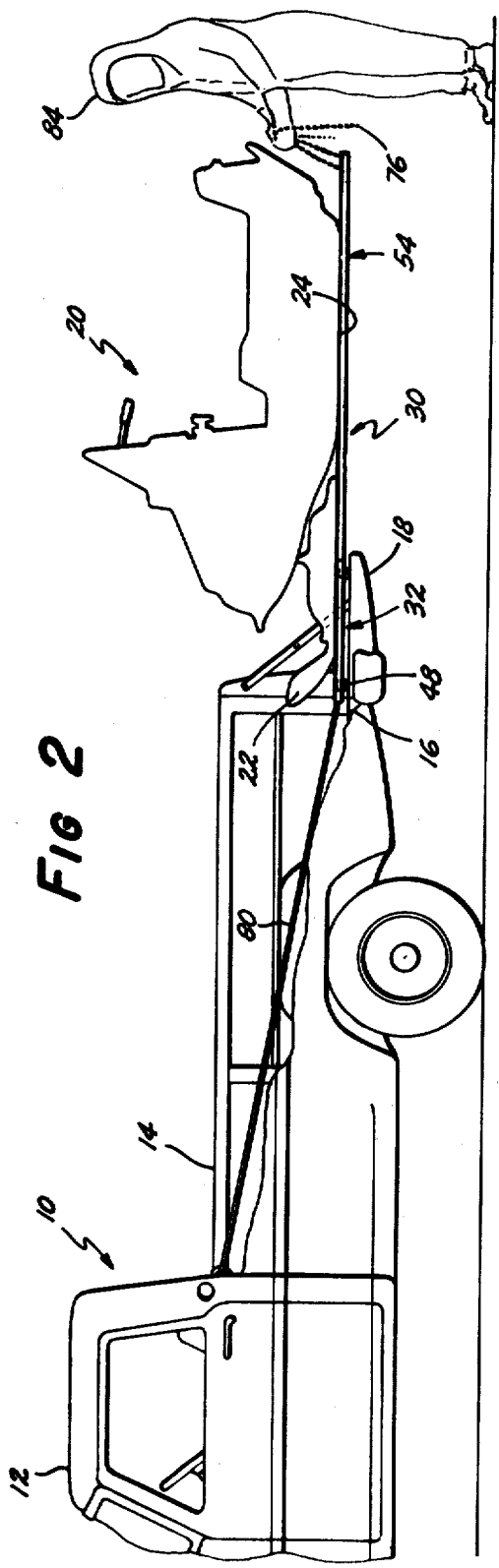
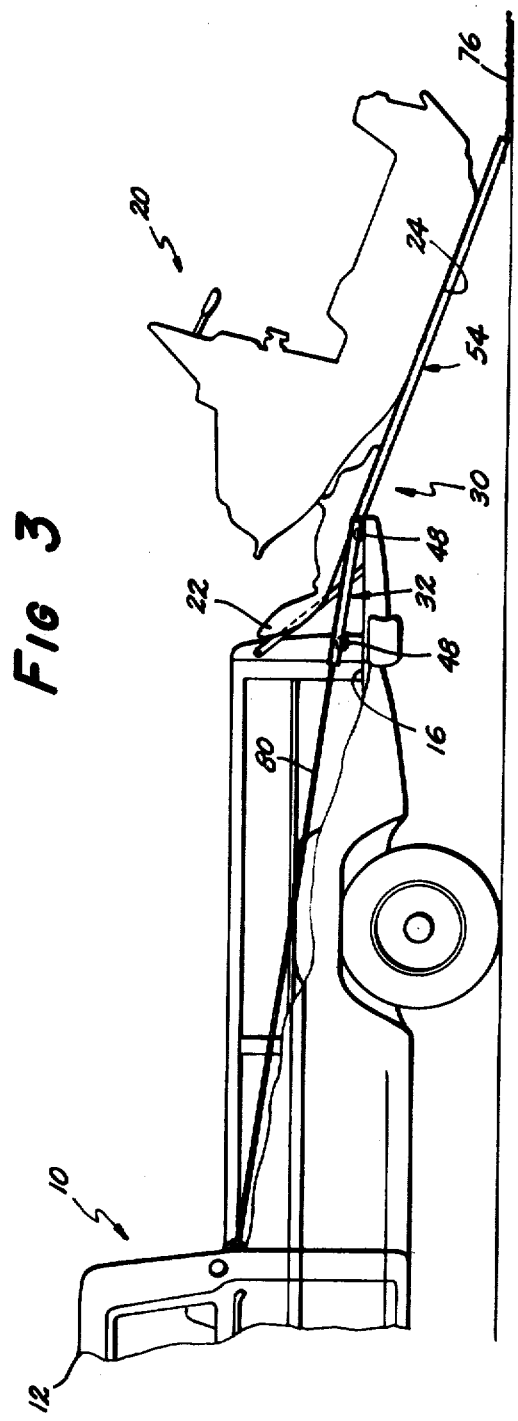
INVENTOR.
EARL W. HAUGLAND
BY
Dugger, Peterson, Johnson & Westman
ATTORNEYS

DEVICE FOR LOADING A SNOWMOBILE ONTO A TRUCK

BACKGROUND OF THE INVENTION

1. Field of the Invention

This invention relates generally to snowmobiles, and pertains more particularly to a device for loading a snowmobile onto a truck.

2. Description of the Prior Art

As far as I am aware, snowmobiles have been laboriously picked up in order to place them in the box of a truck. This entails a considerable amount of physical effort and usually requires two people to perform the loading operation.

SUMMARY OF THE INVENTION

One object of the invention is to provide an extremely simple and lightweight device that facilitates the loading of a snowmobile onto a truck or the like.

Another object of the invention is to provide a device that will be relatively inexpensive to manufacture, thereby encouraging its widespread use by snowmobile owners, particularly those relying upon trucks and trailers for transporting their machines.

The invention also has for an object the provision of a device that remains beneath the snowmobile during transit.

Also, an aim of the invention is to provide a device having a width corresponding generally to the snowmobile itself, thus permitting the loading of two snowmobiles into a side-by-side position on a conventional pickup truck.

Yet another object is to provide a device that permits the snowmobile to be unloaded as readily as it is loaded, it being only necessary to reverse the procedural steps.

Another object of the invention is to provide a device for loading snowmobiles that will take up only a comparatively small amount of space when stored.

Briefly, the invention includes two hinged sections, one of which has a plurality of wheels so that it can be placed on the tailgate of a truck and the other concurrently forming an inclined ramp. By first moving the snowmobile onto the inclined ramp section, this section can be manually raised so that it is substantially horizontal or level with the wheeled section. The device can then be moved forwardly along the floor of the truck, the wheels permitting this, until the snowmobile is fully contained within the truck box.

BRIEF DESCRIPTION OF THE DRAWINGS

FIG. 1 is a side elevational view of a pickup truck with my device rolled forwardly so that the snowmobile is fully loaded into the box of the truck;

FIG. 2 illustrates an intermediate step in loading a snowmobile in accordance with my invention, a portion of the nearer side wall of the truck's box having been removed;

FIG. 3 is a view showing the snowmobile initially moved onto the ramp section, the step preceding that depicted in FIG. 2;

FIG. 4 is a top plan view of my device; as it would appear in FIG. 2 without the snowmobile thereon.

FIG. 5 is a fragmentary perspective view, the view showing the wheeled section and the upper portion of the inclined ramp section; and in the general relation they would assume in FIG. 3 prior to a snowmobile being moved onto the ramp section; and FIG. 6 is a sectional view taken in the direction of line 6—6 of FIG. 5, an intermediate portion having been removed to permit the use of an enlarged scale.

DESCRIPTION OF THE PREFERRED EMBODIMENT

Inasmuch as my invention possesses particular utility in the transporting of a snowmobile via a pickup truck, such a truck has been generally denoted by the reference numeral 10 and conventionally includes a cab 12 and a rear box 14. The rear box portion has a floor 16 and a tailgate 18 that can be lowered in the usual manner from the position illustrated in FIG. 1 to that shown in FIGS. 2 and 3.

A typical snowmobile has been generally indicated by the reference numeral 20 and conventionally includes forwardly disposed steering skis 22 and a traction belt (not specifically depicted) at 24. Owing to the popularity and extensive use of snowmobiles, it is not thought necessary to describe the snowmobile 20 any more fully.

My device for loading the snowmobile 20 has been indicated generally by the reference numeral 30. The device 30 comprises a first rigid or platform section 32 composed of a pair of laterally spaced channel members 34, 36. As best viewed in FIG. 5, each channel member 34 and 36 is formed with spaced side walls 38 and a bottom wall 40. Also, pins 43 extend between the side walls 38, there being one such pin near each end of the two channel members 34 and 36. A roller 44 is journaled on each pin 43.

At this time, attention is directed to the provision of rectangularly configured openings 46 formed in the bottom walls 40 of the two channel members 34, 36. There are four such openings 46 and each has associated therewith a wheel 48, segmental portions of the wheels extending beneath the bottom walls 40 as can be seen from FIGS. 5 and 6. The wheels 48 are mounted for rotation on shafts 50 that have their opposite ends fixedly attached, as by welding, to the underside of the bottom walls 40. Additionally, there is a cross bar or rod 52 extending between the channel members 34 and 36, the cross bar 52 serving to space the channel members 34 and 36 laterally with respect to each other. It will be understood that the opposite ends of the cross bar 52 are suitably secured to the innermost side walls 38 of the channel members 34 and 36, suggestively by welding.

A second rigid or ramp section 54 is included in the device 30. In this instance, the section 54 is also composed of two channel-shaped members 56 and 58, preferably having the same cross sectional configuration as the members 34 and 36. Thus, each has a pair of side walls 60 and a common or connecting bottom wall 62. Also, as with the previously described channel members 34 and 36, pins 65 (one appearing in FIG. 6) are employed with a roller 66 journaled thereon.

The section 54 has a plurality of cross bars or rods 68 that maintain the laterally spaced relationship of the channel members 56 and 58. It will be appreciated that the cross bars 68 have the same length as the cross bar 52, thereby providing the same lateral spacing between the channel members 56 and 58 as between the channel members 34 and 36 and thus longitudinally aligning the members 34, 56 and 36, 58, respectively. It will be further appreciated that the cross bars 52 and 68 have a length slightly greater than the width of the usual traction belt 24 so that the snowmobile 20 will be supported on the cross bars 52 and 68, and not the channel members 34, 36, 56, 58, during the loading procedure. The section 54, since it must initially provide full support for the snowmobile 20 should have a length generally commensurate with that of the snowmobile.

The device 30 further includes four hinges 70 comprised of in each instance a strip 72 welded at one end to one side of the side wall 38 and having a pin or bolt 74 extending through its other end and the side wall 60, so as to provide a pivotal connection therebetween.

In order to facilitate the lifting or raising of the second section 54, which initially functions as a ramp, a chain 76 has its ends attached to the rearmost cross bar 68 of the section 54. Desirably, a cross bar 78 extends between portions of the chain 76 so as to make the lifting of the section 54 easier.

Still further, it is contemplated that an anchor cable 80 extend from a hole 82 (FIG. 5) formed at the forward end of the channel member 34, the other end of the cable 80 being connected to a portion of the cab 12 in any suitable manner. This obviates any tendency for the section 32 to roll rearwardly.

To complete the pictorial presentation, an operator 84 is shown in FIG. 2 in the process of raising the second section 54.

Having presented the foregoing description, it is thought that the manner of using my device 30 and the benefits flowing therefrom will be completely understood. Nonetheless, a brief summation of the several steps employed during the loading procedure may be of some benefit. Therefore, it will be noted that the snowmobile 30 is first moved onto the second section 54 with the first section 32 resting on the tailgate 16. This is readily achieved by pushing the snowmobile 20 onto the cross bars 68 with the skis 22 on the rollers 66 or using the snowmobile's engine to self-propel it into this position.

With the snowmobile 20 located as shown in FIG. 3, the next step is to elevate the ramp or second section 54 so that it becomes substantially horizontal or planar with respect to the first or wheeled section 32. This leveling is achieved by manually lifting the chain 76 as illustrated in FIG. 2. The cable 80 prevents any backward movement of the device 30.

With the condition reached that has been shown in FIG. 2, it will be appreciated that the first section 32 can be rolled forwardly along the floor 16 of the truck 10. This is done while the operator 84 still holds the chain 76 as shown in FIG. 2. The wheels 86 on the section 54 facilitate the advancement. When fully advanced or received within the box 14, the operator 84 can then release his hold on the chain 76. The mere weight of the snowmobile tends to resist rearward movement of the device 30, but any suitable anchoring means may be used. One would also normally wish to anchor the snowmobile against shifting, as is commonly done when transporting snowmobiles, so, if desired, suitable stops can be added to the section 32 to prevent undesired rearward movement of the snowmobile 20 during transit. I have found a semicircular rubber bumper adequate for this purpose, the bumper being appropriately secured in place by adhesive and/or screws so as to engage the heel of one ski 22. The bumper, it will be understood, may be substituted for one of the rollers 44 adjacent the hinged end of the section 32, the snowmobile 20 then being moved sufficiently forward on the device 30 so that the skis 22, which ride on the rollers 44 during the final loading procedure, are positioned sufficiently far forwardly so that one ski heel is obstructively engaged to the needed degree to prevent the unwanted rearward rolling during transit. Thus, the wheels 48 enable the operator 84 to shift the entire device 30 forwardly with the snowmobile 20 carried thereon and the rubber bumper, when employed, then prevents rearward movement of the snowmobile relative the device 30. The device and the snowmobile then remain in this position during transit. The unloading is accomplished by simply reversing the foregoing loading steps.

The device 30 can be compactly stored when not in use, such as between seasons, by reversely folding the sections 32, 54 together so that the bottom walls 40 confront the bottom walls 62.

What I claim is:

1. A device for loading a snowmobile onto a truck comprising first and second rigid sections over which the snowmobile to be loaded may be moved, hinged means pivotally connecting the adjacent ends of said sections together, and a plurality of wheels associated with said first section so that said first section may be advanced from the tailgate end of the truck forwardly along the floor thereof, said second section having a length sufficient to support thereon at least the major portion of the snowmobile, whereby when said first section is placed in an elevated position on the tailgate or floor of the truck said second section provides an inclined ramp onto which the snowmobile can be first moved so that the second section with the snowmobile thereon can be raised into a generally horizontal or planar relation with said first section in order to permit wheeled advancement of said first section in a forward direction while said second section is maintained in its raised condition with said snowmobile supported thereon.

2. The device of claim 1 in which each of said sections includes a pair of longitudinal elements, and means maintaining each pair of elements in the same laterally spaced parallel relation.

3. The device of claim 2 in which each of said longitudinal elements has a channel-shaped cross section forming side walls and a connecting bottom wall, the bottom walls of the elements contained in said first section having openings through which segmental portions of said wheels extend for rolling contact with the truck's floor.

4. The device of claim 3 in which there is an opening and wheel adjacent each end of each longitudinal element contained in said first section, and a shaft for rotatably mounting each wheel, said shafts being attached to the undersides of said bottom walls.

5. The device of claim 3 in which said hinge means includes strips secured at one end to the side walls of the longitudinal elements of one section and pivotally connected at their other ends to the adjacent ends of the side walls of the other of said sections at the adjacent ends thereof.

6. The device of claim 5 in which said second section includes a plurality of longitudinally spaced cross bars extending laterally between its said pair of longitudinal elements for maintaining the lateral spacing of said last-mentioned longitudinal elements and for also initially supporting the snowmobile.

7. A device in accordance with claim 5 including a chain having its ends connected to the end of said second section remote from said hinges.

8. A device in accordance with claim 6 including a plurality of rollers extending between the side walls of said channel-shaped members.

9. A device in accordance with claim 6 including a chain having its opposite ends attached to the cross bar nearest the end of said second section remote from said hinges.

* * * * *